US008863243B1

United States Patent
Lidzborski

(10) Patent No.: US 8,863,243 B1
(45) Date of Patent: Oct. 14, 2014

(54) LOCATION-BASED ACCESS CONTROL FOR PORTABLE ELECTRONIC DEVICE

(75) Inventor: Nicolas Lidzborski, Redwood City, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/444,115

(22) Filed: Apr. 11, 2012

(51) Int. Cl.
*G06F 17/30* (2006.01)
*G06F 15/16* (2006.01)
*H04L 29/06* (2006.01)
*H04W 12/06* (2009.01)
*G06F 21/00* (2013.01)

(52) U.S. Cl.
CPC .............. *H04W 12/06* (2013.01); *H04L 63/102* (2013.01)
USPC .................... 726/4; 726/7; 713/186; 709/245

(58) Field of Classification Search
CPC ....... H04L 63/08; H04L 63/102; H04L 63/10; G06F 21/6218; H04W 12/06
USPC .......... 726/2–8; 713/168–174, 182–186, 202; 709/225, 229
See application file for complete search history.

(56) References Cited

U.S. PATENT DOCUMENTS

| | | | | |
|---|---|---|---|---|
| 8,181,015 | B2* | 5/2012 | Roskind | 713/155 |
| 2009/0049544 | A1* | 2/2009 | Kashi | 726/19 |
| 2010/0138444 | A1* | 6/2010 | Logue et al. | 707/769 |
| 2010/0175116 | A1 | 7/2010 | Gum | |
| 2012/0239950 | A1* | 9/2012 | Davis et al. | 713/320 |
| 2013/0024376 | A1* | 1/2013 | Choudhuri et al. | 705/44 |

* cited by examiner

*Primary Examiner* — Evans Desrosiers
(74) *Attorney, Agent, or Firm* — Fox Rothschild LLP

(57) ABSTRACT

When a portable electronic device receives an access request for an application, the device detects one or more available communication networks. Based on the detected network or networks, the device determines a current location. The device then accesses a usage data store to determine whether the access request and the current location correspond to a familiar usage pattern. If the access request and the current location do not correspond to a familiar usage pattern, the device presents a security prompt and denies the access request until a verified response to the security prompt is received.

20 Claims, 3 Drawing Sheets

LOCATION-BASED ACCESS CONTROL FOR PORTABLE ELECTRONIC DEVICE

TECHNICAL FIELD

The subject matter described herein relates to portable electronic device security methods and systems.

BACKGROUND

Portable electronic devices, such as smart phones, personal digital assistants, laptop computers, tablet computing devices, media players and the like typically employ security settings that enable the device to be locked until a user is authenticated to the device.

Sometimes an electronic device may be lost or stolen. If the device's owner has not enabled the device's security settings, or if the security setting is compromised, the owner risks exposing his or her data to others. The owner also may be subject to usage fees, if the person who stole the device hijack's the device's security settings and uses it to make phone calls or perform financial transactions.

This document describes methods for addressing some or all of the issues described above.

SUMMARY

In an embodiment, a portable electronic device receives, via a user input, an access request for an application of the electronic device. The device's processor detects one or more available communication networks. Based on the detected one or more communications networks, the processor determines a current location. The processor then accesses a usage data store to determine whether the access request and the current location correspond to a familiar usage pattern. If the access request and the current location do not correspond to a familiar usage pattern, the device presents a security prompt and denies the access request until a verified response to the security prompt is received. The device may determine a current location by receiving global positioning system data and determining the current location based on the global positioning system data, and/or by receiving a network address corresponding to a wireless communications network that the device has detected and determining the current location based on the network address, and/or by other methods.

In some embodiments, the device also may receive a group of successful user authentication entries. If so, the device will determine a location of the device corresponding to each of the successful user authentication entries, save each of the determined locations in a computer-readable memory as a familiar location, and update the usage data store to set each of the familiar locations as an element of a familiar usage pattern. In addition, the device may receive a set of successful access requests for the application. If so, it may determine a location of the device corresponding to each of the successful access requests, save each of the determined locations in a computer-readable memory as a familiar location, and update the usage data store to set each of the familiar locations as an element of a familiar usage pattern.

In some embodiments, determining whether the access request corresponds to a familiar usage pattern may include determining whether the current location matches any of the familiar locations, and then only determining that the access request corresponds to a familiar usage pattern comprises if the current location matches any of the familiar locations.

In some embodiments, the device's processor also may access the data store to identify a risk level for the application. If the identified risk level is above a risk threshold, the device may present the security prompt without regard to whether the access request and the current location correspond to a familiar usage pattern. In additional embodiments, if the device determines that the application is a financial transaction application, and if the access request and the current location do not correspond to a familiar usage pattern, then the device may transmit a security alert to a financial institution.

In some embodiments, the device may determine whether the current location is a familiar location. Then if the device determining that the current location has remained unchanged for at least a threshold period of time that the current location and the threshold period of time correspond to an unfamiliar usage pattern, it may initiate a security action in response to the determination of the unfamiliar usage pattern.

In some embodiments, a user may enter location information with an access request. If so, the device may compare the user-entered location information with the determined location information. If the entered location information with the determined location information do not match, the device may determine that the access request and the current location do not correspond to the familiar usage pattern.

Any or all of the process elements described above may be implemented by an electronic device having a processor, a user interface, and a memory. The memory stores programming instructions that, when executed, instruct the processor to perform the relevant process elements.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

For the purposes of this document, a "passcode" refers to any input that may be used to authenticate a user of an electronic device. For example, a passcode may include a sequence of characters such as letters, numbers, icons or other symbols, voice prompts or other characters that may be used to authenticate a user requesting access to an electronic device. Alternative, a passcode may include a biometric identifier, such as a fingerprint recognition or a facial recognition technology.

Figure 1:
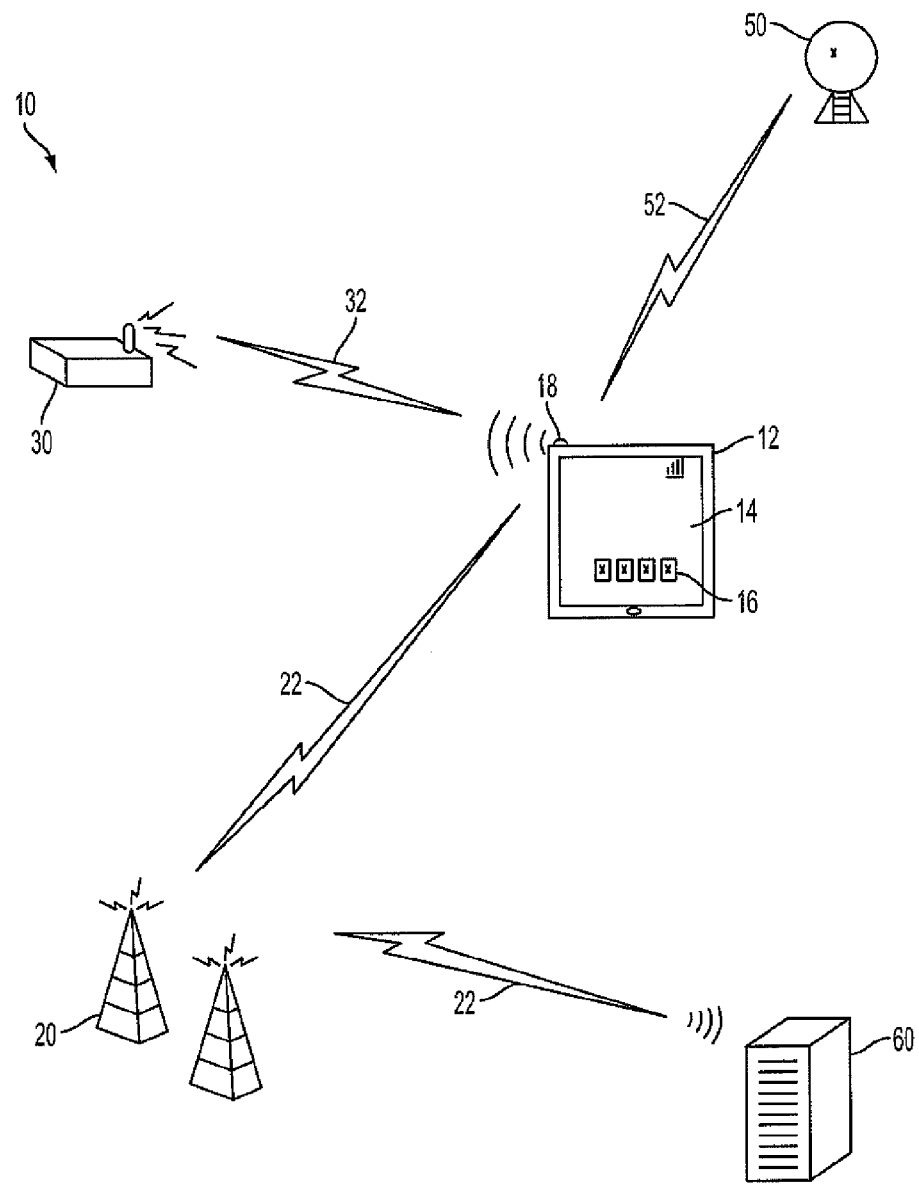
FIG. 1 illustrates a system that may be used to determine a location of a portable electronic device.

FIG. 1 illustrates a system 10 that may be used to provide a location-based security function on a portable electronic device 12. In this document, a "portable electronic device" refers to an electronic device that includes a processor; a tangible, computer-readable memory; and a communications link 18 such as a transceiver or communications port that enables the device to send and receive signals via one or more wireless communications networks. Portable electronic devices may include, for example smart phones, personal digital assistants, laptop computers, tablet computing devices, media players and the like. The electronic device 12 may include a display 14 and one or more input sensors 16 such as touch screen elements of a display and/or buttons, keys, switches or the like.

The electronic device 12 may send and receive data via one or more communications networks 32, 22. For example, one or more transmission towers 20 may relay data and/or voice signals to the device via a wireless network 22. A wi-fi network 32 or similar hotspot may send and receive signals from a router 30 or similar device. A satellite 50 may send or receive signals 52 such as global positioning system (GPS) location data to and from the device. Optionally, a server 60 may be in communication with one or more of the networks so that it sends and/or receives information to and/or from the device.

Many existing electronic devices are configured to automatically enter a secured, or locked, state when not in use for specific amounts of time. The user may then be required to perform an authentication process in order to transition the device from the secured state (in which the user cannot use the device) to an insecure state (in which the user may use the device and access the device's functions). Examples of authentication processes include the entry of passcodes, facial recognition methods, voice recognition patterns, gestures, and other now or hereafter known authentication technologies. For example, the device may include a display such as a touch screen with a touch-sensitive field 14 on which the user must swipe or place his or her finger. The authentication required by the touch-sensitive field may simply be a swipe of the finger, or it may be a biometric recognition technology such as a fingerprint reader. The display or a keypad of the device may accept an authentication code such as personal identification number (PIN) or passcode. An audio input such as a microphone may accept an authentication such as by a voice-entered passcode or PIN. An image sensor such as a camera may capture an image of the user so that the device can perform facial recognition. A near field communications (NFC) sensor may detect when the device is in the communication range of a token than emits a passcode via NFC signal. Any or all of these authentication methods will be implemented by programming instructions that are stored in a memory and used by the processor of the electronic device, or by a processor of a remote server that is in electronic communication with the electronic device via a wireless or wired communication network.

Figure 2:
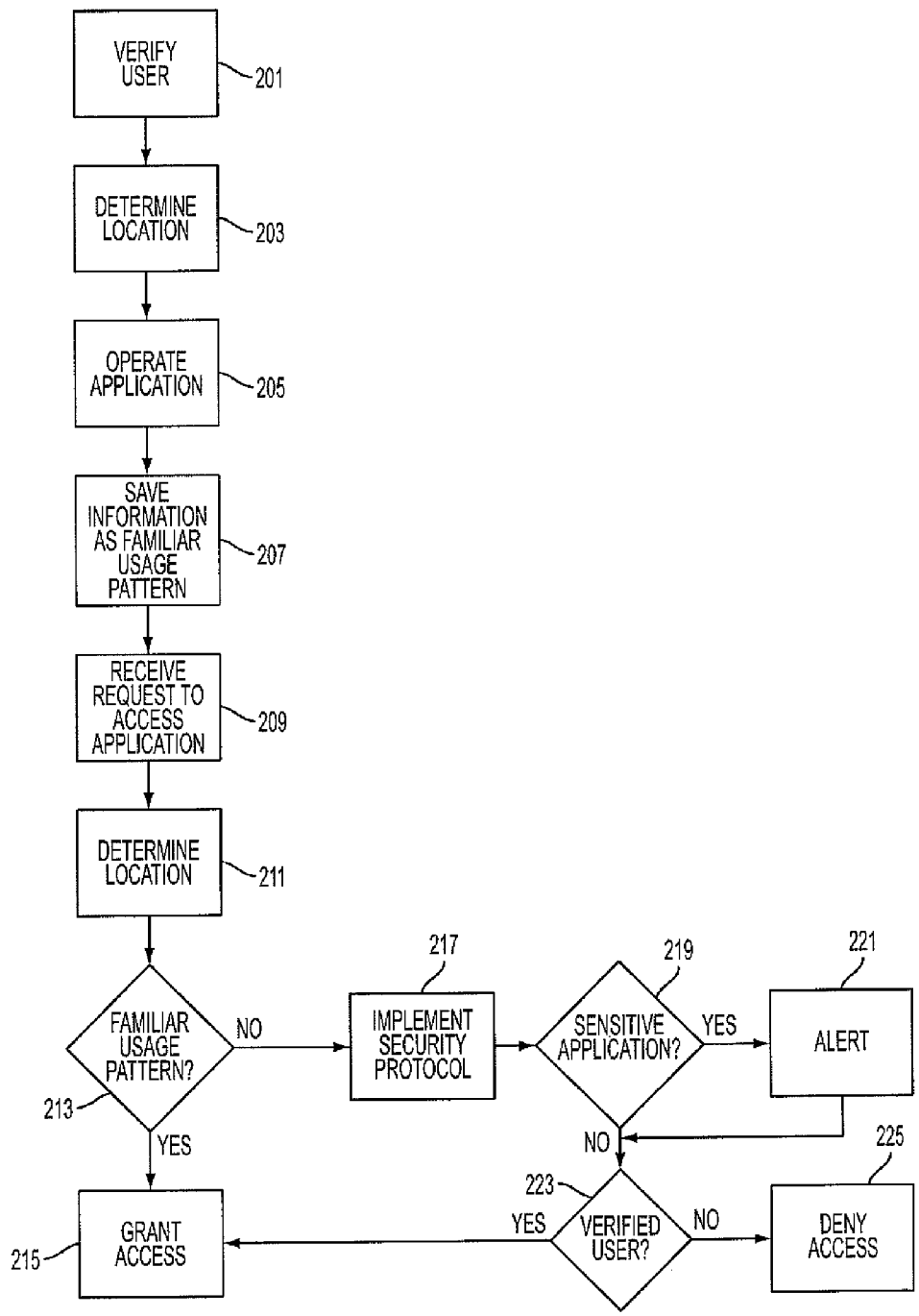
FIG. 2 is a flowchart describing elements of an example of location-based access control process.

FIG. 2 illustrates a process that may be used to implement location-based access control methods for one or more applications that are stored on, and/or executed by, an electronic device. As used in this document, an application may include a software application that is stored on the device, or one or more functions that any hardware element of the device may implement. When the device receives a request to access the device or an application on the device, it may first verify that the user is an authorized user (step 201). As described above, user authentication may be implemented by requiring the user to enter a passcode, by a facial recognition method, by a voice recognition method, by detecting a gesture, or by other now or hereafter known authentication processes.

The system may then determine a location of the device (step 203). In some embodiments, the device may prompt the user may to enter location information into a user interface. In other embodiments, the device may be programmed to automatically gather location information, such as by retrieving GPS location data or a network address, and saving the location information in a memory. In addition to gathering the location information for a network that the device is using, the device may gather location information for one or more other networks that are in range of the device and which the device detects. The gathering may occur periodically, such as after the passage of a certain number of minutes. Alternatively, the gathering may be prompted by the occurrence of an event, such as a successful authentication event, the change of the device from an unlocked state to a locked state, the launching of an application, or some other action.

When the user is verified and the location is determined, the user may be granted access to one or more applications on the device (step 205). The device may then save one or more familiar usage patterns to a data store (step 207), which may be housed on a memory of the electronic device, or on an external memory that is accessible to the device. A familiar usage pattern may be a combination of operations that the device executes after user verification, along with the determined location of the device during the execution. For example, the device may determine that a mail application is executed while the device is located in a geographic location X. Thus, the combination of "mail application" and "geographic location X" may be established as a familiar usage pattern. Optionally, the system may require that a particular combination occur at least a threshold number of times before it is considered to be a familiar usage pattern. As a variation on the example above, the system could only establish the combination of "mail application" and "geographic location X" as a familiar usage pattern only after the combination has occurred after at least ten successful user authentication entries.

In some embodiments, different applications may have different thresholds based on risk associated with the application. For example, a mail application or a financial transaction application may have a threshold of ten successful user authentication entries before a location will be made part of a familiar usage pattern for that application, while a videogame may have a threshold of one—or perhaps no threshold at all.

As another example, a familiar usage pattern may be set as a determination that the location of the device (as determined by the device's GPS or network address data) matches the location of an action taken by one or more applications of the device. For example, the device may be equipped with a web browser application, and when the application accesses a website, the Internet Protocol address of that website may vary based on the site being accessed. Thus, if the device's geographic location does not match a geographic location of the IP address, or if the geographic location of the IP address is not (based on previous usage data) a familiar location for the device, the device may detect an unfamiliar usage pattern.

In some embodiments, a familiar usage pattern may be set to correspond to a familiar location, regardless of the application that is run. For example, any location for which the location information is saved in the memory in at least a threshold amount may correspond to a familiar usage pattern. The threshold amount may be, for example, a threshold number of locations detected over a recent period of time, a total threshold level, or a threshold percentage of all locations that are saved to the memory over an immediately preceding period of time. For example, the system may gather and save location information on an hourly basis and save the information in memory for 5 days. As new location information is gathered, the oldest information may be purged from the memory. When the device analyzes the data, it may determine that any location (e.g., GPS data or network address) that makes up at least 15 percent of the stored data corresponds to a familiar usage pattern. Alternatively, the device may use a most frequent places threshold, such as a number of (e.g., top five) locations that each correspond to more stored data than any other location. Other thresholds and time periods are possible.

In some embodiments, a familiar usage pattern also may have an upper threshold. For example, the system may determine that on certain days or times of day (such as weekdays between 8:00 a.m. and 5:00 p.m.) the user moves around a lot and is unlikely to leave the device in a single location for more than a threshold period, such as two hours. Thus, if the device stays in one location for more than the threshold period on one of those days, the device may detect that it is not acting in accordance with a familiar usage pattern.

Later, when the device is in a secured state, such as being locked so that a passcode is required before a user can access some or all of the device's applications, the device may receive a request to access an application of the electronic device (step 209). The access request may be a swipe on the device's touch screen, a press of a button, a voice command, or any other detected input from a user. In response to the access request, the device may determine the device's current location by detecting a location for the network to which the device is connected (step 211). Alternatively, the current location may be determined based on the location for one or more networks that are detected, such as available wireless networks, even if the device is not connected to that network. The device will then determine whether the application request and the current location correspond to any of the stored familiar usage patterns (step 213). If the application request and current location correspond to a familiar usage pattern, then the device may grant the access request (step 215) and make the application available to the user.

If the application request and current location do not correspond to a familiar usage pattern, the device may implement a security protocol requiring an authentication procedure (step 217). The device may then present the user with a prompt to perform the applicable authentication process. If the user performs the process, such as entry of a passcode, and the system verifies that the user is an authorized user (step 223), the device may grant the access request and make the application available to the user (step 215). Otherwise, the device may deny the access request (step 225) until the user is verified.

Optionally, if the application request and current location do not correspond to a familiar usage pattern, the device also may determine whether the application is classified as a sensitive application (step 219). A sensitive application may be one that has access to the user's personal or financial information, such as a shopping application, banking application or other application that enables the user to engage in a financial transaction. Other examples include mail applications, texting applications, and other applications that have access to the user's personal communications and/or contacts. If the application is a sensitive application, the system may send an alert to a designated recipient, such as an email or text message to a financial institution in the case of a financial transaction application (step 221).

In some embodiments, different authentication processes may be required for different applications, based on a risk level that is assigned to the application. For example, a financial transaction application may be required to follow the security protocol regardless of location, such that the financial transaction application does not correspond to any familiar usage patterns. Or, a high-risk application may correspond to a familiar usage pattern only if it is used after user authentication is received a relatively large number of times, such as 10 times within a month.

In some embodiments, the device could also compare a current location of the device as determined to a user-entered location. For example, the device may use GPS location data or an address of networks that the device detects, compare that data to a database that correlates GPS data or network address data to geographic locations, and use the result of the comparison to determine a current location of the device. The device may then receive user-entered location information, such as the entry of a shipping address in a shopping software application or via a web form, and compare the user-entered information with the automatically detected information. If the user-entered information and the automatically detected information do not match, the system may take a security action. A security action may include an action such as sending an email, text or other alert message to the device's owner, to a financial institution, or to an administrator. In some embodiments, a "match" need not be a precise match, but may be determined by geographic boundaries such as countries or a combination of countries. For example, to locations may be considered a "match" if they are within the same country, or within a defined group of countries such as the European Union.

Figure 3:
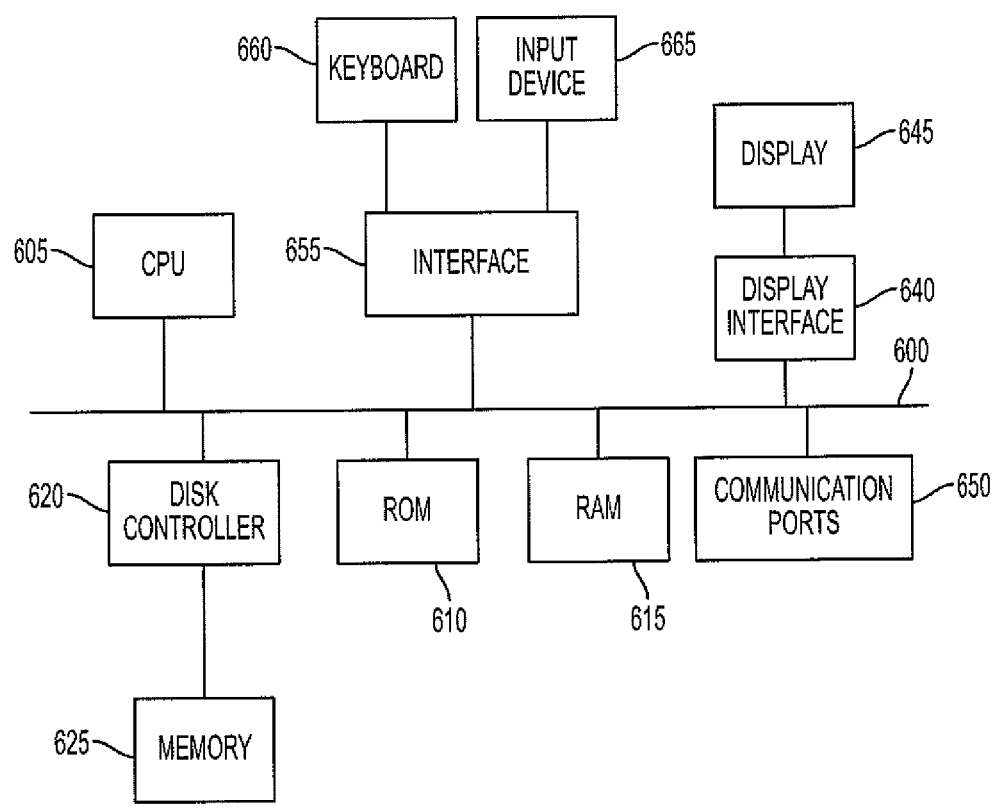
FIG. 3 is a block diagram of hardware that may be used to contain or implement program instructions according to an embodiment.

FIG. 3 is a block diagram of exemplary hardware that may be used to contain or implement program instructions according to an embodiment. A bus 600 serves as the main information pathway interconnecting the other illustrated components of the hardware. CPU 605 is the central processing unit of the system, performing calculations and logic operations required to execute a program. Read only memory (ROM) 610 and random access memory (RAM) 615 constitute exemplary memory devices.

A controller 620 interfaces with one or more optional tangible, non-transitory memory devices 625 to the system bus 600. These memory devices 625 may include, for example, an external or internal DVD drive, a CD ROM drive, a hard drive, flash memory, a USB drive or the like. As indicated previously, these various drives and controllers are optional devices.

Program instructions may be stored in the ROM 610 and/or the RAM 615. Optionally, program instructions may be stored on a tangible computer readable storage medium such as a hard disk, compact disk, a digital disk, flash memory, a memory card, a USB drive, an optical disc storage medium, such as Blu-ray™ disc, and/or other recording medium.

An optional display interface 640 may permit information from the bus 600 to be displayed on the display 645 in audio, visual, graphic or alphanumeric format. Communication with external devices may occur using various communication ports 650. A communication port 650 may be attached to a communications network, such as the Internet or an intranet.

The hardware may also include an interface 655 which allows for receipt of data from input devices such as a keyboard 660 or other input device 665 such as a mouse, a joystick, a touch screen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method, comprising:
   receiving, via an input of a portable electronic device, an access request for an application of the electronic device;
   by a processor of the electronic device, detecting one or more available communication networks;
   by the processor, based on the detected one or more communications networks, determining a current location of the portable electronic device;
   by the processor, identifying a threshold number of successful user authentication entries, wherein the threshold number is indicative of a risk level associated with the application;
   by the processor, accessing a usage data store to determine whether the access request and the current location correspond to a familiar usage pattern, wherein the familiar usage pattern comprises a combination of the access request having been received in the current location with at least the threshold number of successful user authentication entries; and
   by the processor, if the access request and the current location do not correspond to a familiar usage pattern, presenting a security prompt on the electronic device and denying the access request until a verified response to the security prompt is received.

2. The method of claim 1, further comprising:
   receiving, via an input of the portable electronic device, a plurality of successful user authentication entries;
   determining a location of the device corresponding to each of the successful user authentication entries;
   saving in a computer-readable memory each of the determined locations as familiar locations; and
   updating the usage data store to set each of the familiar locations as an element of a familiar usage pattern.

3. The method of claim 2, wherein determining whether the access request corresponds to a familiar usage pattern comprises:
   determining whether the current location matches any of the familiar locations; and
   only determining that the access request corresponds to a familiar usage pattern comprises if the current location matches any of the familiar locations.

4. The method of claim 1, further comprising:
   receiving, via an input of the portable electronic device, a plurality of successful access requests for the application;
   determining a location of the device corresponding to each of the successful access requests;
   for each location that is determined to correspond to a successful access request at least a threshold number of times, updating the usage data store to set the determined location and the successful access request as elements of a familiar usage pattern; and
   purging an oldest familiar usage pattern from the data store.

5. The method of claim 4, wherein determining whether the access request corresponds to a familiar usage pattern comprises:
   determining whether the current location matches any of the familiar locations; and
   only determining that the access request corresponds to a familiar usage pattern comprises if the current location matches any of the familiar locations.

6. The method of claim 1, further comprising:
   accessing, by the processor, the data store to identify the risk level for the application; and
   if the identified risk level is above a risk threshold, presenting the security prompt without regard to whether the access request and the current location correspond to a familiar usage pattern.

7. The method of claim 1, further comprising:
   determining that the application is a financial transaction application; and
   if the access request and the current location do not correspond to a familiar usage pattern, transmitting a security alert to a financial institution.

8. The method of claim 1, wherein determining the current location of the device comprises one or both of:
   receiving global positioning system data and determining the current location based on the global positioning system data;
   receiving a network address corresponding to a wireless communications network that the device has detected, and determining the current location based on the network address.

9. A method, comprising:
   receiving, via an input of a portable electronic device, a successful user authentication entry;
   by a processor of the electronic device, determining a location corresponding to the successful user authentication entry;
   by the processor of the electronic device, identifying a threshold number of successful user authentication entries, wherein the threshold number is indicative of a risk level associated with a first application;
   concluding that at least the threshold number of additional successful user authentication entries have been received while the device was at the determined location;
   saving in a computer-readable memory of the device the determined location as a familiar location;
   while the device is in the familiar location, executing the first application;
   saving in the computer-readable memory an identifier for the first application in association with the familiar location as a familiar usage pattern;
   after the saving, receiving, via the input device, an access request for the first application;
   by the electronic device, detecting one or more available communication networks;
   by the electronic device, determining based on the detected one or more communications networks, a current location;
   by the electronic device, determining whether the access request and the current location correspond to the familiar usage pattern; and
   denying the access request until the electronic device determines that either:
      the access request and the current location correspond to the familiar usage pattern, or
      a verified passcode is received via the user interface.

10. The method of claim 9, further comprising:
    determining whether the current location is a familiar location;
    determining that the current location has remained unchanged for at least a threshold period of time; and
    determining that the current location and threshold period of time correspond to an unfamiliar usage pattern; and
    initiating a security action in response to the determination of the unfamiliar usage pattern.

11. The method of claim 9, wherein the access request includes user-entered location information, and the method also comprises:
- comparing the user-entered location information with the determined location information; and
- if the entered location information with the determined location information do not match, determining that the access request and the current location do not correspond to the familiar usage pattern.

12. The method of claim 9, wherein determining the current location of the device comprises one or both of:
- receiving global positioning system data and determining the current location based on the global positioning system data;
- receiving a network address corresponding to a wireless communications network that the device has detected, and determining the current location based on the network address.

13. An electronic device, comprising:
- a processor,
- a user interface, and
- a tangible, computer-readable memory having programming instructions that, when executed, instruct the processor to:
  - receive, via the user interface, an access request for an application of the electronic device;
  - detect one or more available communication networks;
  - determine, based on the detected one or more communications networks, a current location of the portable electronic device;
  - identify a threshold number of successful user authentication entries, wherein the threshold number is indicative of a risk level associated with the application;
  - access a usage data store to determine whether the access request and the current location correspond to a familiar usage pattern that includes at least the threshold number of successful user authentication entries received while the device was at the current location; and
  - deny the access request until the processor determines that either:
    - the access request and the current location correspond to a familiar usage pattern, or
    - a verified passcode is received via the user interface.

14. The system of claim 13, wherein the memory also has programming instructions that, when executed, instruct the processor to:
- receive, via the user interface, a plurality of successful user authentication entries;
- determine a location of the device corresponding to each of the successful user authentication entries;
- for each location that is determined to correspond to a successful access request at least a threshold number of times, update the usage data store to set the determined location and the successful access request as elements of a familiar usage pattern; and
- purging an oldest familiar usage pattern from the usage data store.

15. The system of claim 14, wherein the instructions that instruct the processor to determine whether the access request corresponds to a familiar usage pattern comprises instructions that cause the processor to:
- determine whether the current location matches any of the familiar locations; and
- only determine that the access request corresponds to a familiar usage pattern comprises if the current location matches any of the familiar locations.

16. The system of claim 13, wherein the memory also has programming instructions that, when executed, instruct the processor to:
- receive, via the user interface, a plurality of successful access requests for the application;
- determine a location of the device corresponding to each of the successful access requests;
- save each of the determined locations as a familiar location; and
- update the usage data store to set each of the familiar locations as an element of a familiar usage pattern.

17. The system of claim 16, wherein the instructions that instruct the processor to determine whether the access request corresponds to a familiar usage pattern comprises instructions that cause the processor to:
- determine whether the current location matches any of the familiar locations; and
- only determine that the access request corresponds to a familiar usage pattern comprises if the current location matches any of the familiar locations.

18. The system of claim 13, wherein the memory also has programming instructions that, when executed, instruct the processor to:
- access the usage data store to identify the risk level for the application; and
- if the identified risk level is above a risk threshold, present the security prompt without regard to whether the access request and the current location correspond to a familiar usage pattern.

19. The system of claim 13, wherein the memory also has programming instructions that, when executed, instruct the processor to:
- determine that the application is a financial transaction application; and
- if the access request and the current location do not correspond to a familiar usage pattern, transmit a security alert to a financial institution.

20. The method of claim 13, wherein the instructions that instruct the processor to determine the current location of the device comprise instructions that cause the processor to performs one or both of the following:
- receive global positioning system data and determine the current location based on the global positioning system data; or
- receive a network address corresponding to a wireless communications network that the device has detected, and determining the current location based on the network address.

* * * * *